(12) United States Patent
Hartel et al.

(10) Patent No.: US 8,613,407 B2  
(45) Date of Patent: Dec. 24, 2013

(54) ASSEMBLY FOR SEPARATING A SPACE INTO MULTIPLE AREAS

(75) Inventors: Sven Hartel, Bremen (DE); Volkhard Wendt, Weyhe (DE)

(73) Assignee: Airbus Operations GmbH (DE)

( * ) Notice: Subject to any disclaimer, the term of this patent is extended or adjusted under 35 U.S.C. 154(b) by 493 days.

(21) Appl. No.: 12/994,514

(22) PCT Filed: May 14, 2009

(86) PCT No.: PCT/EP2009/055875  
§ 371 (c)(1),  
(2), (4) Date: Dec. 7, 2010

(87) PCT Pub. No.: WO2009/150005  
PCT Pub. Date: Dec. 17, 2009

(65) Prior Publication Data  
US 2011/0084166 A1  Apr. 14, 2011

Related U.S. Application Data

(60) Provisional application No. 61/130,134, filed on May 28, 2008.

(30) Foreign Application Priority Data

May 28, 2008 (DE) .......................... 10 2008 025 390

(51) Int. Cl.  
*B64D 11/00* (2006.01)

(52) U.S. Cl.  
USPC ........ 244/118.5; 160/351; 160/377; 160/369; 410/129

(58) Field of Classification Search  
USPC .................... 244/118.1, 118.5, 129.2, 129.4; 160/351, 377, 369, 368.1, 98, 239; 280/749; 410/129, 130  
See application file for complete search history.

(56) References Cited

U.S. PATENT DOCUMENTS

| | | | |
|---|---|---|---|
| 3,423,121 A | | 1/1969 | Lipkin |
| 3,548,904 A | * | 12/1970 | Mackell .......................... 53/473 |
| 4,095,837 A | | 6/1978 | Hunter |
| 4,595,227 A | | 6/1986 | Setina |
| 4,899,962 A | * | 2/1990 | Mueller ..................... 244/129.2 |

(Continued)

FOREIGN PATENT DOCUMENTS

| | | |
|---|---|---|
| CN | 1152525 A | 6/1997 |
| CN | 1596209 A | 3/2005 |

(Continued)

*Primary Examiner* — Christopher P Ellis  
(74) *Attorney, Agent, or Firm* — Lerner, David, Littenberg, Krumholz & Mentlik, LLP

(57) ABSTRACT

The invention relates to an arrangement for dividing a space into a plurality of areas, said arrangement comprising at least one frame with at least one fixing means for holding the frame in corresponding frame receiving elements, and at least one foldable defining means. The frame is formed in such a way that the arrangement essentially fits onto at least one wall of the space when it is fixed, the foldable defining means being able to be held on the frame and preventing an air flow between adjacent areas of the space separated by the arrangement. The arrangement according to the invention enables a thermal separation of two adjacent areas of a space, that can each be air-conditioned differently, without forming an area containing air which is a mixture from two regions at different temperatures.

11 Claims, 4 Drawing Sheets

(56) References Cited

U.S. PATENT DOCUMENTS

Figure 1:
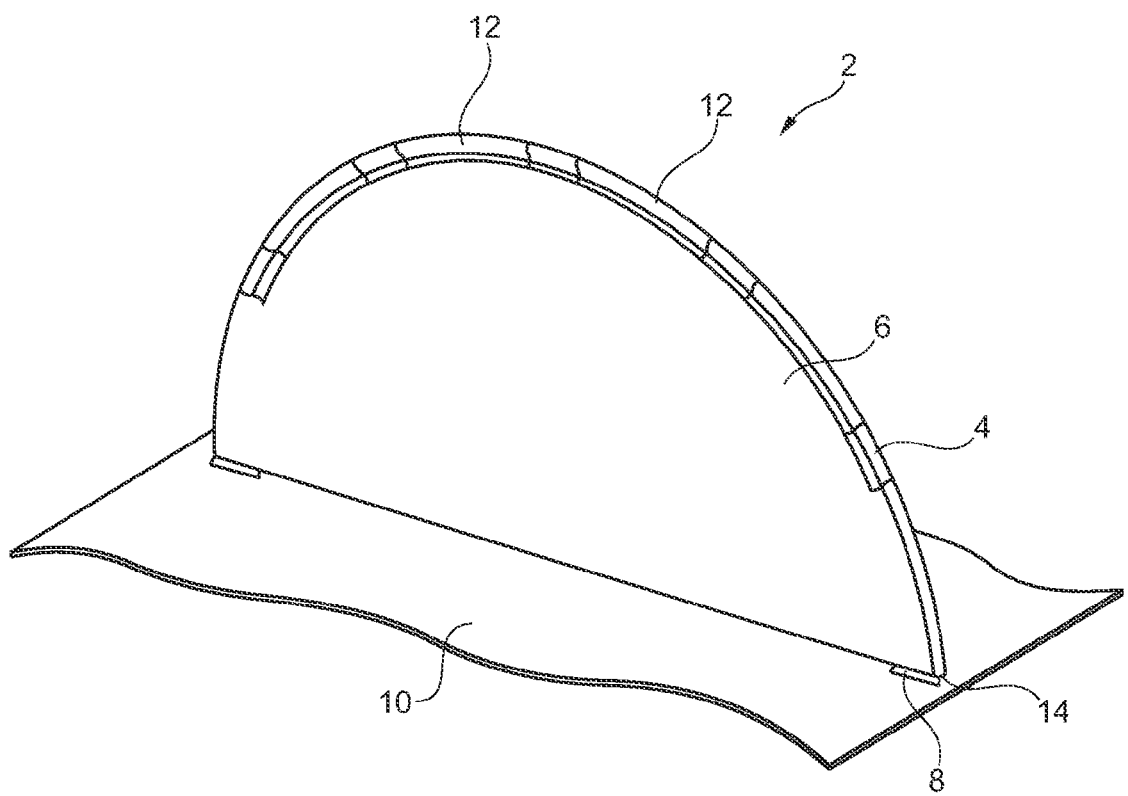

| | | | |
|---|---|---|---|
| 5,201,481 A * | 4/1993 | Hararat-Tehrani | 244/118.1 |
| 5,238,282 A | 8/1993 | Watson et al. | |
| 5,393,013 A * | 2/1995 | Schneider et al. | 244/118.5 |
| 5,540,402 A * | 7/1996 | Carducci | 244/118.1 |
| 6,007,024 A | 12/1999 | Stephan | |
| 6,010,286 A * | 1/2000 | Cross et al. | 410/129 |
| 6,523,779 B1 | 2/2003 | Michel | |
| 7,204,457 B2 * | 4/2007 | Ackerman et al. | 244/118.1 |
| 8,177,275 B2 * | 5/2012 | Willis et al. | 296/24.43 |
| 2004/0245897 A1 | 12/2004 | Stephan et al. | |
| 2007/0018044 A1 | 1/2007 | Bock | |
| 2007/0210597 A1 * | 9/2007 | Wang | 296/24.43 |
| 2009/0242150 A1 * | 10/2009 | Mosler et al. | 160/368.1 |
| 2009/0283636 A1 | 11/2009 | Saint-Jalmes et al. | |
| 2012/0273613 A1 * | 11/2012 | Ulbrich-Gasparevic et al. | 244/118.1 |

FOREIGN PATENT DOCUMENTS

| | | |
|---|---|---|
| DE | 3922579 A1 | 1/1991 |
| DE | 20106547 U1 | 8/2001 |
| DE | 10314890 B3 | 8/2004 |
| JP | 54-007716 | 1/1979 |
| JP | 57-004456 | 1/1982 |
| JP | 02-081791 | 3/1990 |
| JP | 2009-522148 A | 6/2009 |
| WO | 2007/073938 A1 | 7/2007 |

* cited by examiner

ASSEMBLY FOR SEPARATING A SPACE INTO MULTIPLE AREAS

CROSS-REFERENCE TO RELATED APPLICATIONS

This application is a National Phase entry under 35 U.S.C.§371of International Application No. PCT/EP2009/055875, filed May 14, 2009, published in German, which claims the benefit of the filing date of U.S. Provisional Patent Application No. 61/130,134 filed May 28, 2008 and of German Patent Application No. 10 2008 025 390.1 filed May 28, 2008, the entire disclosures of which are hereby incorporated herein by reference.

TECHNICAL FIELD

The invention relates to an assembly for separating a space into multiple areas.

BACKGROUND OF THE INVENTION

Assemblies for separating a space into multiple areas are well known. In the invention described below, in particular an assembly for separating a space is spotlighted more closely, which assembly can be used in a space as required, wherein said assembly to a large extent creates thermal separation between areas separated from each other, thus making it possible to maintain different spatial climates.

For the purpose of separating a space—for example a cabin or a cargo compartment of a vehicle—wall-like assemblies are used in the state of the art. Moreover, assemblies are known that fully cover the free cross section of a cargo compartment in an aircraft, thus essentially preventing any passing of smoke from one area to the adjacent area. Installation of such assemblies is relatively elaborate because it is frequently necessary to arrange separate holding devices on the floor or on the walls of the cargo compartment, to which holding devices one or several panel-shaped components are to be attached. The size of these components depends on the size of the access openings of the cargo compartment, because components that are too large cannot be conveyed into the compartment. Small access openings could therefore make it necessary to subdivide the assemblies for separating the space, which assemblies are to be installed. Furthermore, the assembly of the panel-shaped components in high compartments would at least require a ladder, and frequently also a second person who carries out the assembly, for passing and holding components, fastening materials and tools.

Remaining with the example of a cargo compartment in an aircraft, for better economy it is necessary to minimise the duration the aircraft stays on the ground. If it becomes necessary for the transport of different goods to spatially and thermally separate several multiple areas of the cargo compartment, quick installation and removal of assemblies for separating the cargo compartment is desired. After such assemblies have been affixed, in a first area of the cargo compartment goods could be transported that require a lower or higher temperature, a higher or lower fraction of fresh air and the like, than is the case in a second area.

In the case of a cargo compartment that is not thermally separated into multiple areas, with today's aircraft it would usually be possible to create various air conditioning zones, because normally the air conditioning systems of an aircraft are set up for this purpose. Separate control circuits are available that make it possible to supply differently-conditioned air to several zones of a cargo compartment. However, without thermal separation, with different air conditioning in each case a distinct area in which air from the adjacent zones with different conditions mixes in the transition between two adjacent zones. It is not possible to precisely regulate the respective air conditioning state in these transition areas.

If an assembly for separating a space of the design described above were used, this would require increased installation effort or integration effort that would arise immediately prior to a flight. Within a targeted turnaround time of 90 minutes in which the aircraft is unloaded and loaded again, installation would not be possible because, during installation, activities of loading the aircraft would have to cease. Consequently, during the installation of such an assembly for separating a space, loading of the cargo compartment in the subsequent areas cannot take place. Pushing cargo containers through would not be possible due to the space taken up for installation. Overall this extends the time the aircraft is tied up on the ground, thus negatively affecting the economy of the aircraft.

SUMMARY OF THE INVENTION

It is thus the object of the invention to reduce or entirely eliminate one or several of the above-mentioned disadvantages. In particular it is the object of the invention to propose an assembly for separating a space into multiple areas, which assembly makes possible installation and deinstallation if at all possible without any tools and in a relatively short time. Moreover, the assembly should to the largest extent be independent of any installations on the aircraft side and should thus not result in any excess weight in the base aircraft. Finally, for those cases where the assembly is not used it should be associated with the smallest possible stowage volume and a low dead weight.

The invention meets this object by an assembly for separating a space into multiple areas, which assembly comprises at least one frame with at least one fastening means for holding the frame in corresponding frame receiving devices, and comprises at least one foldable delimiting means, wherein the frame is designed in such a manner that in its attached state the assembly essentially conforms to one or several walls of the space, wherein the foldable delimiting means can be held to the frame and essentially prevents any airflow between adjacent areas of the space that are separated by the assembly.

By means of the assembly according to the invention, thermal separation of several areas or zones in a space is created, which separation can easily be installed and easily be removed again. The foldable delimiting means, which could, for example, be made from a textile material, some other textile-like woven material, a film or foil, a canvas or some other rollable and/or foldable material, can preferably in its folded-together state be transported in one piece into the space where it can be unfolded and suspended from the frame. The frame and the delimiting means are matched to the contours of the spaces in which the assembly according to the invention is to be used. Due to the possible use of a textile-like woven material the delimiting means can be implemented with a relatively low specific weight so that the frame does not have to absorb particularly great mass forces. Furthermore, as a result of this the inertia forces of the delimiting means are also relatively modest so that in particular a frame of the assembly according to the invention, which frame is used in a cargo compartment of an aircraft, is subjected only to relatively modest loads.

Overall in this way a lightweight transportable assembly is created which fully takes up the cross section of the space, thus preventing any airflow between the spatial areas that are separated from each other. Consequently, different climate zones are achievable in the separated areas without the occurrence of mixing effects in the transition between the areas.

In an advantageous improvement of the assembly according to the invention, the frame receiving devices are arranged in the region of the floor of the space. The frame receiving devices could be designed as eyelets, sleeves, pins or the like, while the fastening means, for example of an arc-shaped frame, can also be a plug-shaped end. This tapering end of the frame could be attached in a frame receiving device by simple plugging. However, frame receiving devices could also be shaped in such a manner that fastening the frame is possible also without direct reaching of the frame receiving devices, for example by means of a funnel-shaped frame receiving device. By arranging the frame receiving devices near the floor, the frame can be fastened to the floor of the space, and consequently there is essentially no need to use a ladder to affix the assembly according to the invention. Since furthermore the frame, due to the relatively low loads experienced, does not have to comprise a particularly large cross section, moreover, fastening of the assembly according to the invention could be carried out by a single person.

In a preferred embodiment of the assembly according to the invention, the frame receiving devices can be placed and fastened in rails that already exist in the floor of the space, so that no particular preliminary work is required for positioning the frame receiving devices within the space. Furthermore, affixing the assembly according to the invention is consequently very flexible. For example, in cargo compartments of aircraft there are fastening rails for locking cargo containers into place, which fastening rails comprise fastening recesses, usually spaced apart from each other at a 1-inch pitch, to which fastening recesses the frame receiving devices can be affixed.

In a preferred improvement of the assembly according to the invention the frame is designed so as to be elastic. Consequently, after installation in the space, the preferably preformed frame in the most favourable case deforms in such a manner that it conforms to a wall or to several walls of the space, thus as far as possible completely taking up the cross-sectional area of the cargo compartment. If the assembly according to the invention is, for example, to be arranged in a cargo compartment of an aircraft, said cargo compartment usually comprises a circular-segment-shaped or circular-sector-shaped cross section. Accordingly, the elastic frame could be designed such that in a circular-segment-shaped space it conforms to the wall over the entire wall surface, while its two ends are fastened in the floor area of the space.

In an advantageous embodiment the assembly according to the invention comprises a stabilisation device in the form of a supporting frame that is arranged so as to be offset relative to the frame. If, for example, the frame and the supporting frame are implemented as frame arcs, these two elements could be connected, thus mutually supporting one another. Consequently, fastening the assembly according to the invention to the floor could already produce adequate stability.

In an advantageous improvement of the assembly according to the invention the supporting frame is arranged relative to the frame so as to be rotated by a predetermined angle on a vertical axis extending in the space. Consequently, the frame and the supporting frame can be connected by their apex, and stabilisation of the assembly can be brought about in a manner similar to that in dome-shaped tents. Consequently, the assembly according to the invention requires no further fastening to the structure of the space.

In a further advantageous embodiment of the assembly according to the invention the frame comprises several segments that are separatable from each other for transporting the frame.

In an additional improvement of the assembly according to the invention the frame is furthermore adapted, for support at least in some regions, to be inserted into at least one holder element that is arranged within the space. The holder element could, for example, be situated on the ceiling of the space, into which holder element the frame can be hooked, plugged, latched, slid, or in some other manner be brought to establish a positive-locking or non-positive locking connection. It is imaginable for several such holder elements to be arranged within the space, which holder elements are, for example, arranged in an equidistant manner In a particularly preferred embodiment the holder element is designed as a profile component comprising a recess. Consequently, the frame of the assembly according to the invention can be pushed into the recess. The frame is then supported by the sides or lateral walls of the recess. A u-profile is imaginable that comprises two lateral walls that are essentially arranged so as to be parallel or at a slight angle relative to each other, against which lateral walls a frame can be supported. The u-profile could be arranged at the ceiling of the space, wherein the opening of the profile is directed towards the floor of the space. After the frame has been placed in the space, or after plugging the frame segments together so that they form a frame within the space, the frame, which is subsequently equipped with the delimiting means and is partly erected, can be made to connect to a holder element situated at the ceiling of the space, by insertion from the direction of the floor, and, finally by means of the fastening means, can be attached to corresponding frame receiving devices located on the floor. Consequently, the installation is simple to effect, requires no tools or accessories such as a ladder or the like, and can consequently preferably be carried out by a single person.

Finally, the delimiting means of an advantageous embodiment of the assembly according to the invention comprises loops, pockets, tubes or the like for attaching the delimiting means to the frame by threading the frame into these channel-like holding means. Such holding means can preferably be implemented by means of a hollow seam of the delimiting means. This obviates the need for separate fastening means for fastening the delimiting means to the frame, and the design of a deinstalled assembly according to the invention, the deinstallation and the stowage of an assembly according to the invention, which assembly is not in use, are correspondingly simple.

SHORT DESCRIPTION OF THE DRAWINGS

Figure 3:
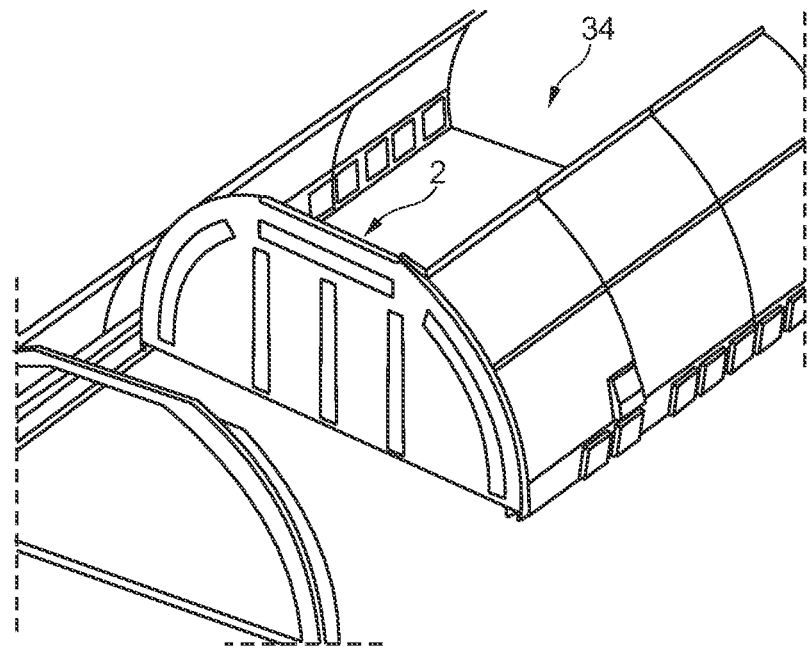
Figure 4:
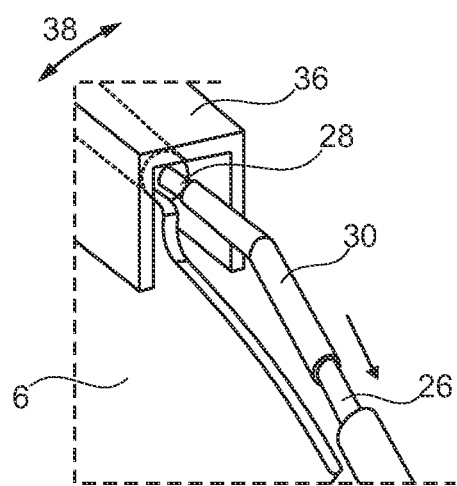
Figure 5:
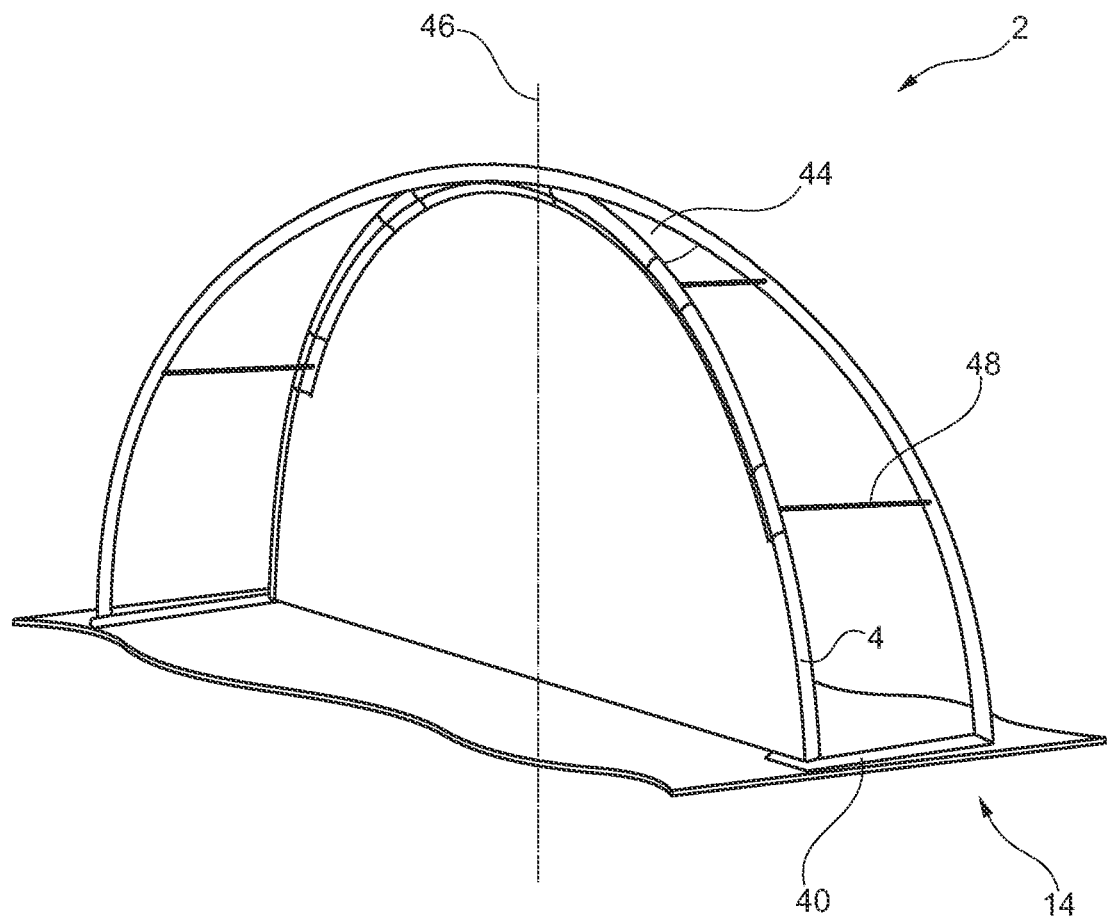

Further characteristics, advantages and application options of the present invention are disclosed in the following description of the exemplary embodiments and of the figures. All the described and/or illustrated characteristics per se and in any combination form the subject of the invention, even irrespective of their composition in individual claims or their interrelationships. Furthermore, identical or similar components in the figures have the same reference characters. The following are shown:

FIG. 1: a three-dimensional view of a first exemplary embodiment of the assembly according to the invention;

FIG. 2a-d: a three-dimensional view of details of the first exemplary embodiment of the assembly according to the invention;

FIG. 3: the assembly according to the invention in its installed state;

FIG. 4: a detailed view of an upper fastening means of the assembly according to the invention;

FIG. 5: a second exemplary embodiment of the assembly according to the invention.

DETAILED DESCRIPTION OF EXEMPLARY EMBODIMENTS

FIG. 1 shows the assembly 2 according to the invention, which comprises a frame 4, a delimiting means 6 and fastening means 8 and is situated on the floor 10 of a cargo compartment of an aircraft. The top of the assembly 2 according to the invention comprises the shape of a circular arc while the bottom is essentially straight and extends parallel to the floor 10. The fastening means 6 is designed as a canvas, a woven nylon material or some other suitable fabric that comprises several pocket-like holding devices 12 through which the frame 4 extends. At the ends of the frame 4 there are fastening means 14 that are connected to corresponding frame receiving devices which are, for example, arranged in the floor 10.

As a result of the relatively slim design of the frame 4 and its preferably elastic construction it is possible to convey the frame 4 relatively easily into the cargo compartment of an aircraft. In said compartment the frame 4 can be brought from a pre-curved shape to the desired shape so that the frame 4 conforms to a wall of the cabin. As a result of the delimiting means 6 arranged on the frame 4 a wall arises, which essentially prevents the occurrence of an airflow between two adjacent areas or zones in the cargo compartment, which areas or zones are separate. While there are air-permeable holes between the individual pocket-like holding devices 12 between the frame 4 and the delimiting means 6, in the most favourable case these holes are so small relative to the covered cross-sectional area that with usual air exchange rates in the aircraft practically no cross flow between the zones separated from each other occurs.

Figure 2A:
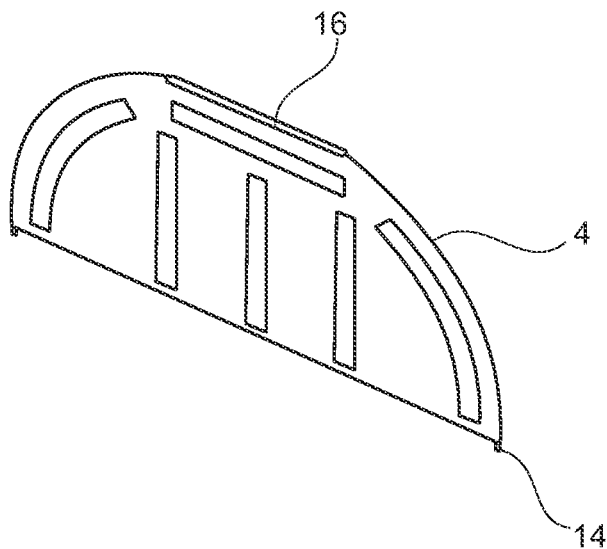

As shown in FIG. 2a, it is not mandatory for the frame 4 to comprise the shape of a complete circular arc. It is assumed that at the top of the cargo compartment there is a flattened ceiling region in which, for example, various lines extend from one region of the aircraft to another region of the aircraft. This region comprises panelling that extends, for example, parallel to the floor 10 of the cargo compartment. For this reason a frame 4 could also comprise a flattened top 16 that is designed in such a manner that in its installed state the frame 4 connects the wall areas of the space to the ceiling region.

Figure 2B:
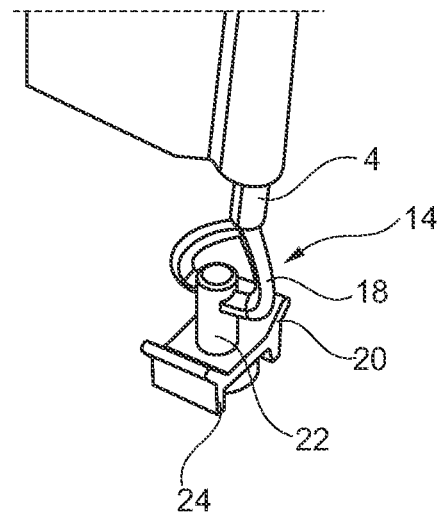

FIG. 2b shows a possible fastening element 14 in more detail. The diagram shows a frame 4 which at one end comprises an eyelet 18 that is held in a hole 20 of a pin 22. The pin 22 in turn is located in a locking element 24, the like of which is, for example, used for locking tie-downs for nets in cargo compartments of aircraft. This locking element 24 can be inserted in a frame receiving device in the form of a hole (not shown) of a floor rail or seat rail (not shown either), which could, for example, be designed to conform with standard AS 33601, and which can be moved by a specific distance and can be locked at the position reached. In this way it is possible to hold the frame 4 at two ends. It should be noted that the fastening means 14 should be arranged as far on the outside of the floor 10 as possible so that the best possible conformity of the frame 4 to the contour of the cargo compartment can be achieved. A multitude of further frame receiving devices are imaginable, with the invention not being restricted to the combination comprising the locking element 24 and the eyelet 18. For example, the frame 4 could comprise tapered ends that can be inserted into the receiving holes or into funnel-shaped holding devices. The frame ends could also comprise an undercut profile for receiving a snap fastening device comprising a latch that is arranged in a receiving hole or the like. Any positive-locking or non-positive-locking connecting means are suitable for implementing a frame receiving device.

Figure 2C:
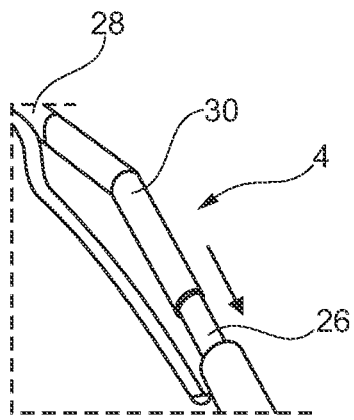

FIG. 2c shows that a frame 4 can also comprise several segments. For example, two adjacent segments 26 and 28 are shown which at their abutting point are interconnected by means of a receiving sleeve 30, wherein the receiving sleeve is preferably firmly installed on one of the two segments 26 or 28.

Figure 2D:
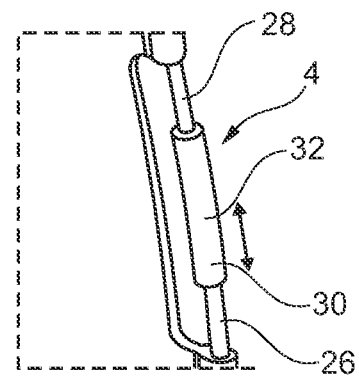

Finally, FIG. 2d shows a possible connection between two segments 26 and 28 of the frame 4 in the form of a tension spring 32. This facilitates installation, because the segments need not be aligned manually before they are plugged together; instead, plugging together essentially takes place automatically.

FIG. 3 clearly shows an installed position of the assembly 2 according to the invention in a cargo compartment 34 of an aircraft, wherein in this illustrated case too the top of the assembly 2 according to the invention comprises a flattened region 16.

FIG. 4 shows that this flattened region 16 advantageously can also be inserted into a correspondingly shaped profile component 36, which in the present case is designed, by way of an example, as a u-profile. In this manner the assembly 2 according to the invention can be affixed in longitudinal direction 38 of the cargo compartment so that no corresponding stiffening members in the floor region become necessary. It is, for example, imaginable for several such profile components 36 to extend over the ceiling of the cargo compartment 34 so that the assembly 2 according to the invention can be supported in numerous predetermined positions in such a profile component 36.

Finally, FIG. 5 shows an advantageous improvement of the assembly 2 according to the invention. The diagram shows fastening means 14 that are designed in the form of adapter plates 40 whose one side is fastened to the frame 4, and whose other side is, for example, fastened to the floor grid of a cargo compartment. Such adapter plates 40 are associated with an advantage in that fastening of the assembly 2 according to the invention to frame receiving devices or other interfaces to form a solid structure can take place, which frame receiving devices or interfaces are not used by other installations, e.g. by a cargo loading system. As an alternative to adapter plates 40 it is also possible to use belts. In addition to this, a supporting frame 42, designed as a stabilisation arc, forms part of the assembly 2 according to the invention, which supporting frame 42 is arranged so as to be rotated by an angle 44 relative to the vertical axis 46. Furthermore, the supporting frame 42 is installed on the adapter plates 40 and is used to provide stability to the frame 4. To this effect at the apex of the frame 4 the supporting frame 42 is connected to the frame 4 so that there is no need for any further affixation to the cargo compartment structure. It is possible to make do without the supporting frame 42 in those cases where the cargo compartment comprises a device, in the ceiling region, for stabilising the frame 4, as has, for example, already been shown in FIG. 4. Furthermore, connecting elements 48 can be arranged between the supporting frame 42 and the frame 4, which connecting elements 48 additionally support the frame 4 in longitudinal direction. These additional connecting elements 48 can be in the form of rods or elastic belts whose fastening can take place by way of eyelets, sleeves or the like.

The arc 4 and the supporting frame 42 preferably comprise an elastic material, for example aluminium, a glass fibre material or a carbon fibre material. This makes possible easy adaptation of the shape of the frame 4 and of the supporting frame 42 to the respective cargo compartment, wherein, however, as a result of many different aircraft types and cargo compartment dimensions, a specially formed frame 4 or supporting frame 42 needs to be prepared for each cargo compartment. In this context it is also possible to plastically pre-form the frame 4 and the supporting frame 42 so that the joined segments of a frame 4, or of frames 4, as such do not require excessive bending forces for adaptation.

List of Reference Characters

2 Assembly according to the invention
4 Frame
6 Delimiting means
8 Fastening means
10 Floor
12 Pocket-like holding devices
14 Fastening means
16 Flattened top of the frame
18 Eyelet
20 Hole of the pin
22 Pin
24 Locking element
26 Segment
28 Segment
30 Receiving sleeve
32 Tension spring
34 Cargo compartment of an aircraft
36 Profile component
38 Longitudinal direction
40 Adapter plate
42 Supporting frame
44 Angle of rotation between the supporting frame and the frame
46 Vertical axis
48 Connecting means between the supporting frame and the frame

The invention claimed is:

1. An assembly for separating a space into multiple areas, comprising:
at least one dimensionally stable frame including at least one fastening means for holding the at least one dimensionally stable frame in corresponding frame receiving devices; and
at least one of foldable means or rollable delimiting means;
wherein the at least one dimensionally stable frame comprises several segments that are separable from each other for transporting the at least one dimensionally stable frame;
wherein the at least one dimensionally stable frame is designed in such a manner that, in an attached state, the assembly conforms to one or more walls of the space;
wherein the at least one of foldable means or rollable delimiting means is holdable to the at least one dimensionally stable frame and prevents any airflow between adjacent areas of the space that are separated by the assembly.

2. The assembly of claim 1, wherein the frame receiving devices are arranged in a region of a floor of the space.

3. The assembly of claim 2, wherein the floor of the space comprises rails for fastening objects, the rails being fastenable.

4. The assembly of claim 1, wherein the at least one dimensionally stable frame is elastic.

5. The assembly of claim 1, further comprising a supporting frame arranged offset relative to the at least one dimensionally stable frame.

6. The assembly of claim 5, wherein the supporting frame is arranged relative to the at least one dimensionally stable frame so as to be rotatable by a predetermined angle on a vertical axis extending in the space.

7. The assembly of claim 5, wherein the supporting frame is connected to the at least one dimensionally stable frame.

8. The assembly of claim 1, wherein the at least one dimensionally stable frame is adapted, for support at least in some regions, to be inserted into at least one holder element arranged within the space.

9. The assembly of claim 8, wherein the at least one holder element is designed as a profile component comprising an indentation.

10. The assembly of claim 1, wherein the at least one foldable means or rollable delimiting means comprises a rollable or foldable material selected from the group consisting of a textile material, a textile-like material, a film, a foil, and a canvas.

11. The assembly of claim 1, wherein the at least one of foldable or rollable delimiting means comprises loops, pockets or tubes for attaching the at least one of foldable or rollable delimiting means to the at least one dimensionally stable frame by inserting the at least one dimensionally stable frame in some regions.

* * * * *